(12) United States Patent
Moon et al.

(10) Patent No.: US 12,744,415 B2
(45) Date of Patent: Sep. 22, 2026

(54) WIRELESS CHARGING SYSTEM, METHOD OF REMOVING FOREIGN OBJECT IN WIRELESS CHARGING SYSTEM, AND COMPUTING DEVICE FOR PERFORMING THE METHOD

(71) Applicant: Electronics and Telecommunications Research Institute, Daejeon (KR)

(72) Inventors: Jung Ick Moon, Daejeon (KR); Gwangzeen Ko, Daejeon (KR); Sang-Won Kim, Daejeon (KR); Seong-Min Kim, Daejeon (KR); In Kui Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 545 days.

(21) Appl. No.: 18/489,536

(22) Filed: Oct. 18, 2023

(65) Prior Publication Data

US 2024/0213814 A1 Jun. 27, 2024

(30) Foreign Application Priority Data

Dec. 22, 2022 (KR) ........................ 10-2022-0181988

(51) Int. Cl.
*H02J 50/60* (2016.01)
*H02J 50/10* (2016.01)
*H02J 50/40* (2016.01)

(52) U.S. Cl.
CPC .............. *H02J 50/60* (2016.02); *H02J 50/10* (2016.02); *H02J 50/402* (2020.01)

(58) Field of Classification Search
CPC ........... H02J 50/60; H02J 50/10; H02J 50/402
(Continued)

(56) References Cited

U.S. PATENT DOCUMENTS 10,910,864 B2 2/2021 Kim et al.
11,387,677 B2 7/2022 Jung
(Continued)

FOREIGN PATENT DOCUMENTS

JP 2016-59141 4/2016
JP 5940784 6/2016
(Continued)

*Primary Examiner* — Nathaniel R Pelton
(74) *Attorney, Agent, or Firm* — KILE PARK REED & HOUTTEMAN PLLC

(57) ABSTRACT

A wireless charging system, a method of removing a foreign object in the wireless charging system, and a computing device performing the method are provided. The wireless charging system includes a transmission coil cover mounted to surround a transmission coil of a transmission device, a reception coil cover mounted to surround a reception coil of a reception device, and a direct current (DC) conducting wire attached to each of the transmission coil cover and the reception coil cover, wherein the wireless charging system may be configured to remove a foreign object attached to the transmission coil cover or the reception coil cover by using a force acting on the DC conducting wire according to a direction of a current flowing in the DC conducting wire and a direction of a magnetic field perpendicular to the direction of the current.

14 Claims, 6 Drawing Sheets

(58) Field of Classification Search
USPC ........................................................ 320/108
See application file for complete search history.

(56) References Cited

U.S. PATENT DOCUMENTS

| | | | | |
|---|---|---|---|---|
| 2022/0158501 | A1 | 5/2022 | Moon et al. | |
| 2022/0278562 | A1* | 9/2022 | Judson .................. | B60L 53/124 |
| 2023/0094624 | A1* | 3/2023 | Imazawa ................ | G01V 3/105<br>324/239 |

FOREIGN PATENT DOCUMENTS

| | | |
|---|---|---|
| KR | 10-2017-0048394 | 5/2017 |
| KR | 10-2020-0056762 | 5/2020 |
| KR | 10-2022-0043625 | 4/2022 |

* cited by examiner

WIRELESS CHARGING SYSTEM, METHOD OF REMOVING FOREIGN OBJECT IN WIRELESS CHARGING SYSTEM, AND COMPUTING DEVICE FOR PERFORMING THE METHOD

CROSS-REFERENCE TO RELATED APPLICATION

This application claims the benefit of Korean Patent Application No. 10-2022-0181988 filed on Dec. 22, 2022, in the Korean Intellectual Property Office, the entire disclosure of which is incorporated herein by reference for all purposes.

BACKGROUND

1. Field of the Invention

One or more embodiments relate to a wireless charging system, and more specifically, to a method and a device for efficiently removing a foreign object through a physical phenomenon using Lorentz's force or Fleming's left-hand rule in a magnetic field when a foreign object is attached to a transmission/reception coil unit in a wireless charging system.

2. Description of the Related Art

With expansion of an application field of wireless charging technology to fields of tens of watts (W) or greater, when a metallic foreign object is attached to or inserted into a coil unit of a wireless charging system, an induced current is generated on a surface of the metallic foreign object due to a strong magnetic field and heat may be generated due to a unique resistivity of the metallic foreign object, which leads to accidents such as fire. In addition, a non-metallic foreign object may also be a potential risk factor depending on a wireless charging system.

Therefore, in operating a wireless charging system, detection of a foreign object is very important, but in a low power wireless charging system for charging a smart device, a foreign object is detected by an electrical method based on voltage measurement and current measurement. However, since detection ability (resolving power) of a circuit that may detect a small metal object significantly decreases as a charging output increases, various methods of detecting a foreign object are additionally devised, such as images and ultrasonic waves.

SUMMARY

One or more embodiments are to provide a method and a device that may efficiently remove a foreign object, when a foreign object is attached to a transmission/reception coil unit in a wireless charging system.

More specifically, one or more embodiments are to provide a method and a device that may remove a foreign object through a physical phenomenon using Lorentz's force or Fleming's left-hand rule in a magnetic field generated in a wireless charging system.

However, technical goals are not limited to the foregoing goals, and there may be other technical goals.

According to an aspect, there is provided a wireless charging system including a transmission coil cover mounted to surround a transmission coil of a transmission device, a reception coil cover mounted to surround a reception coil of a reception device, and a direct current (DC)

conducting wire attached to each of the transmission coil cover and the reception coil cover, wherein the wireless charging system may be configured to remove a foreign object attached to the transmission coil cover or the reception coil cover by using a force acting on the DC conducting wire according to a direction of a current flowing in the DC conducting wire and a direction of a magnetic field perpendicular to the direction of the current.

The DC conducting wire may be attached at a height of an intermediate portion of each of the transmission coil cover and the reception coil cover.

The DC conducting wire may be configured to remove a foreign object attached to the transmission coil cover or the reception coil cover by performing a vibratory motion in a rotational direction when a direction of an applied force is changed by an alternating current (AC) magnetic field applied to the wireless charging system.

The wireless charging system may further include a sensor configured to determine whether a foreign object is present on the transmission coil cover or the reception coil cover, and a switch configured to supply a current to the DC conducting wire based on whether the foreign object determined using the sensor is present.

The switch may be configured to change to an ON state to supply a current to the DC conducting wire when a foreign object is determined to be present on the transmission coil cover or the reception coil cover using the sensor.

The switch may be configured to change to an OFF state to stop supplying a current to the DC conducting wire when a foreign object is determined not to be present on the transmission coil cover or the reception coil cover using the sensor.

According to another aspect, there is provided a method of removing a foreign object in a wireless charging system, the method including, in a process of performing wireless charging through a wireless charging system including a transmission coil of a transmission device and a reception coil of a reception device, determining, using a sensor, whether a foreign object is present on a transmission coil cover mounted to surround the transmission coil or a reception coil cover mounted to surround the reception coil, when a foreign object is determined to be present on the transmission coil cover or the reception coil cover, stopping the wireless charging and supplying a current through a switch to a DC conducting wire attached to the transmission coil cover or the reception coil cover in which the foreign object is determined to be present, for a preset period of time, determining, using the sensor, whether the foreign object that is present on the transmission coil cover or the reception coil cover is removed by the DC conducting wire to which the current is supplied for the preset period of time, and performing the wireless charging again when a foreign object that was present on the transmission coil cover or the reception coil cover is determined to be removed.

The wireless charging system may be configured to remove a foreign object attached to the transmission coil cover or the reception coil cover by using a force acting on the DC conducting wire according to a direction of a current flowing in the DC conducting wire and a direction of a magnetic field perpendicular to the direction of the current.

The DC conducting wire may be attached at a height of an intermediate portion of each of the transmission coil cover and the reception coil cover.

The DC conducting wire may be configured to remove a foreign object attached to the transmission coil cover or the reception coil cover by performing a vibratory motion in a rotational direction when a direction of an applied force is changed by an AC magnetic field applied to the wireless charging system.

According to another aspect, there is provided a computing device including at least one processor and a memory configured to load or store a program executed by the at least one processor, wherein the program may include instructions that cause the processor to perform, in a process of performing wireless charging through a wireless charging system including a transmission coil of a transmission device and a reception coil of a reception device, determining, using a sensor, whether a foreign object is present on a transmission coil cover mounted to surround the transmission coil or a reception coil cover mounted to surround the reception coil, when a foreign object is determined to be present on the transmission coil cover or the reception coil cover, stopping the wireless charging and supplying a current through a switch to a DC conducting wire attached to the transmission coil cover or the reception coil cover in which the foreign object is determined to be present, for a preset period of time, determining, using the sensor, whether the foreign object that is present on the transmission coil cover or the reception coil cover is removed by the DC conducting wire to which the current is supplied for the preset period of time, and performing the wireless charging again when a foreign object that was present on the transmission coil cover or the reception coil cover is determined to be removed.

The wireless charging system may be configured to remove a foreign object attached to the transmission coil cover or the reception coil cover by using a force acting on the DC conducting wire according to a direction of a current flowing in the DC conducting wire and a direction of a magnetic field perpendicular to the direction of the current.

The DC conducting wire may be attached at a height of an intermediate portion of each of the transmission coil cover and the reception coil cover.

The DC conducting wire may be configured to remove a foreign object attached to the transmission coil cover or the reception coil cover by performing a vibratory motion in a rotational direction when a direction of an applied force is changed by an AC magnetic field applied to the wireless charging system.

Additional aspects of embodiments will be set forth in part in the description which follows and, in part, will be apparent from the description, or may be learned by practice of the disclosure.

According to an embodiment, when a foreign object is attached to a transmission/reception coil unit in a wireless charging system, the foreign object may be efficiently removed by using a physical phenomenon of Lorentz's force or Fleming's left-hand rule in a magnetic field.

In addition, according to an embodiment, since a strong magnetic field is used, a foreign object may be efficiently removed with only a relatively weak current, and thus, low power consumption may be achieved to remove a foreign object.

In addition, according to an embodiment, since the method of removing a foreign object does not affect the efficiency of wireless charging, a design burden of a wireless charging system may be reduced.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1A:
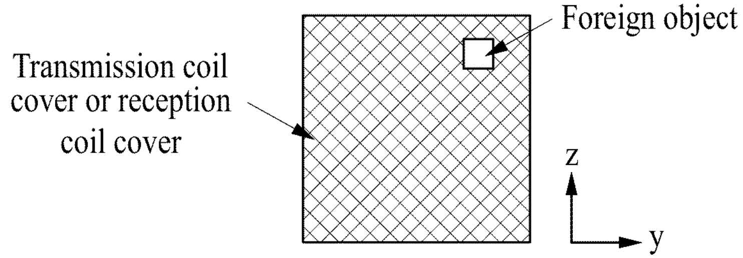
FIGS. 1A to 1C are diagrams illustrating transmission/reception coils of a transmission/reception device included in a wireless charging system, a cover for protecting the transmission/reception coils, and a direction of a magnetic field between the transmission/reception coils, according to an embodiment.

The following detailed structural or functional description is provided as an embodiment only and various alterations and modifications may be made to embodiments. Here, embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms used herein including technical or scientific terms have the same meaning as commonly understood by one of ordinary skill in the art to which embodiments belong. Terms, such as those defined in commonly used dictionaries, should be construed to have meanings matching with contextual meanings in the relevant art and the present disclosure, and are not to be construed as an ideal or excessively formal meaning unless otherwise defined herein.

Hereinafter, embodiments will be described in detail with reference to the accompanying drawings. When describing the embodiments with reference to the accompanying drawings, regardless of drawing numerals, like reference numerals refer to like elements and a repeated description related thereto will be omitted.

Figure 1B:
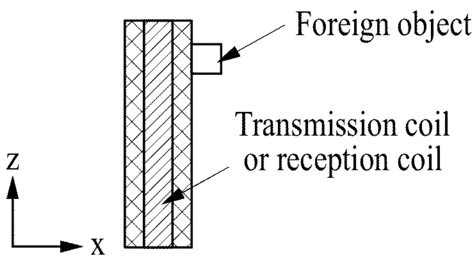
Figure 1C:
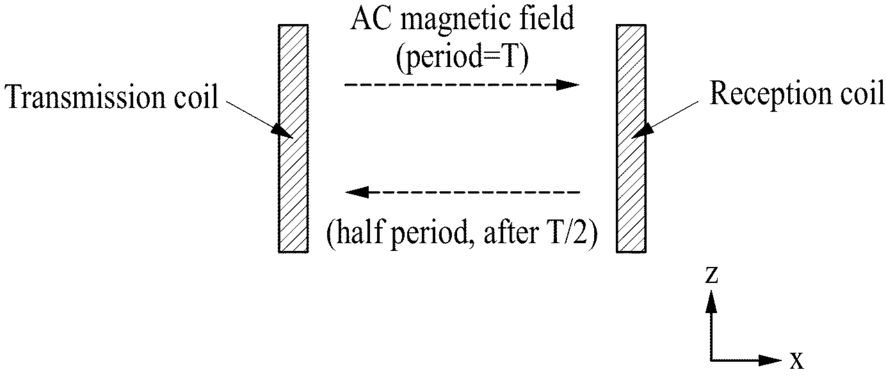

FIGS. 1A to 1C are diagrams illustrating transmission/reception coils of a transmission/reception device included in a wireless charging system, a cover for protecting the transmission/reception coils, and a direction of a magnetic field between the transmission/reception coils, according to an embodiment.

Referring to FIGS. 1A and 1B, a wireless charging system of the present disclosure may prevent an external foreign object from being easily attached to or inserted into a coil of a transmission device (hereinafter referred to as a transmission coil) by mounting a transmission coil cover to surround the transmission coil. Similarly, the wireless charging system may prevent an external foreign object from being attached to or inserted into a coil of a reception device (hereinafter referred to as a reception coil) by mounting a reception coil cover to surround the reception coil.

Here, the wireless charging system of the present disclosure may use an alternating current (AC) magnetic field, and thus, the direction of the magnetic field between the transmission coil and the reception coil may change by 180 degrees every half period, as shown in FIG. 1C. As described above, the wireless charging system of the present disclosure may remove a foreign object attached to or inserted into the transmission coil cover or the reception coil cover by using the direction of the magnetic field between the transmission coil and the reception coil that is changed by the AC magnetic field. A more detailed description of a method of removing a foreign object is provided in detail through the following drawings.

Figure 2:
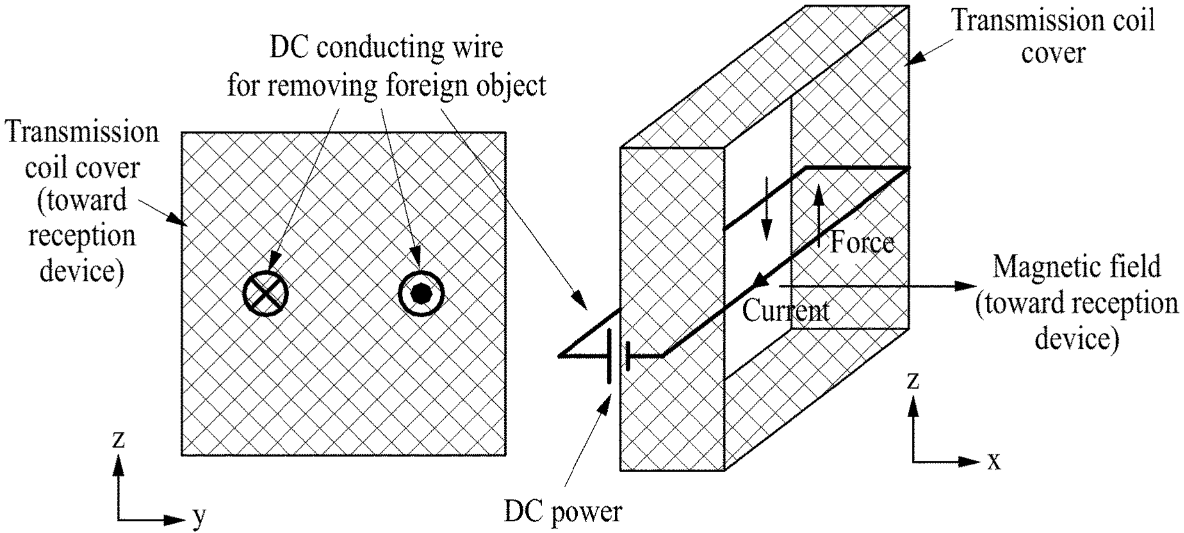
FIG. 2 is a diagram illustrating a transmission coil cover to which a direct current (DC) conducting wire is attached and movement of the DC conducting wire according to magnetic field application, according to an embodiment.

FIG. 2 is a diagram illustrating a transmission coil cover to which a direct current (DC) conducting wire is attached and movement of the DC conducting wire according to magnetic field application, according to an embodiment.

Referring to FIG. 2, a wireless charging system of the present disclosure may be mounted with a DC conducting wire for removing a foreign object on a transmission coil cover. More specifically, the DC conducting wire may be a metal conducting wire and may be disposed to surround the transmission coil cover in the horizontal direction (x-axis and y-axis) at an intermediate height in the vertical direction (z-axis) of the transmission coil cover.

Here, since a magnetic field exists between a transmission device and a reception device in the x-axis direction, when a current is supplied to the DC conducting wire using DC power as shown in FIG. 2, a force may be applied to the DC conducting wire in the vertical direction (the z direction or −z direction) according to Lorentz's force or Flamming's left-hand rule.

More specifically, the DC conducting wire attached to a side of the transmission coil cover toward the reception device is exerted to a force in the z-axis direction according to Lorentz's force or Flamming's left-hand rule, and the DC conducting wire attached to an opposite side is exerted to a force in the −z-axis direction according to Lorentz's force or Flamming's left-hand rule.

That is, since forces of opposite directions are applied to the DC conducting wire on the sides facing each other, the DC conducting wire may rotate and the transmission coil cover mounted with the DC conducting wire may also show the same movement in accordance with the rotation of the DC conducting wire.

Such rotation of the DC conducting wire may be equally applied to a reception coil cover with the same structure as the transmission coil cover mounted with the DC conducting wire.

Figure 3:
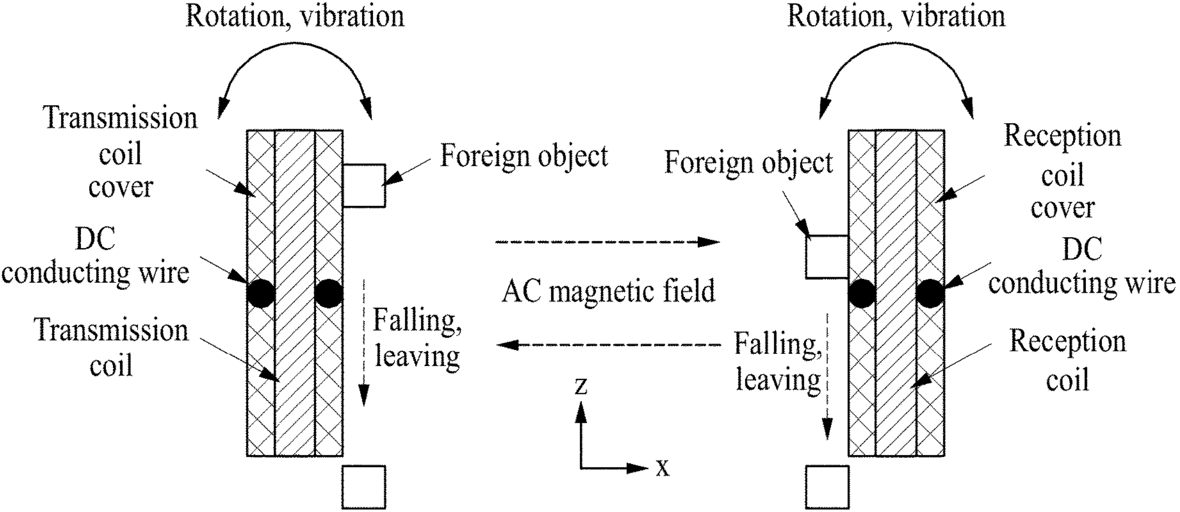
FIG. 3 is a diagram illustrating the principle of removing a foreign object according to an embodiment.

FIG. 3 is a diagram illustrating the principle of removing a foreign object according to an embodiment.

As shown in FIG. 3, when an AC magnetic field of a high frequency is applied between a transmission coil of a transmission device and a reception coil of a reception device, the rotational direction of a DC conducting wire mounted on a transmission coil cover and a DC conducting wire mounted on a reception coil cover may change at a speed corresponding to the frequency to perform a vibratory motion.

Therefore, the transmission coil cover and the reception coil cover mounted with the DC conducting wire may also perform the vibratory motion in accordance with the movement of the DC conducting wire, so that a foreign object attached to or inserted into the transmission coil cover or the reception coil cover may be removed by falling or leaving as shown in FIG. 3.

In an example of FIG. 3, an example is shown that a foreign object is removed by falling in the vertical direction (the −z direction), and when the transmission/reception coils are aligned on the z-axis, falling of the foreign object is difficult, but instead leaving from the transmission/reception coils may be assisted.

In addition, the DC conducting wire may be fixed through an auxiliary instrument (e.g., a pin) to rotate well mechanically, and noise due to the vibration of the transmission/reception coil covers or interference with surrounding instruments may be easily solved in the design of a wireless charging system.

Figure 4:
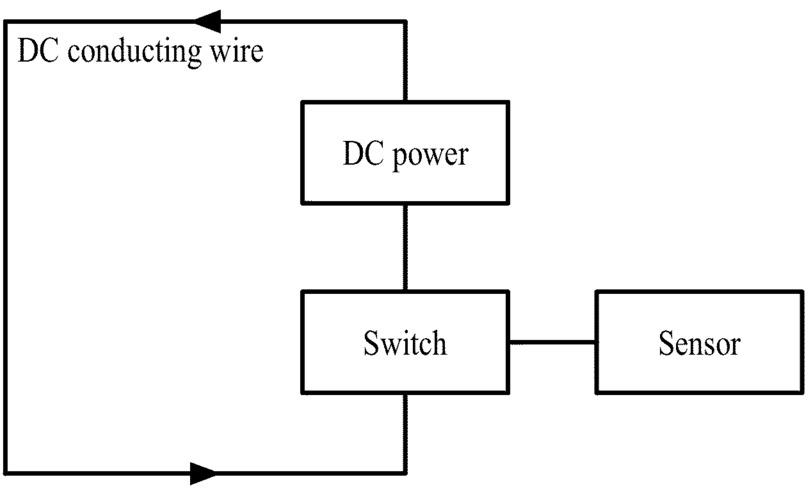
FIG. 4 is a diagram illustrating a configuration of a sensor and a DC power switch connected to the sensor, according to an embodiment.

FIG. 4 is a diagram illustrating a configuration of a sensor and a DC power switch connected to the sensor, according to an embodiment.

A current applied to a DC conducting wire mounted on a transmission coil cover or a reception coil cover may be supplied directly from a DC power supply unit of a transmission device or a reception device or may be supplied using a separate battery. Here, if a current is always supplied to the DC conducting wire, an issue may arise that rotation or vibration is continuously generated in the transmission coil cover or the reception coil cover.

Therefore, a wireless charging system of the present disclosure, as shown in FIG. 4, may further include a sensor configured to determine whether a foreign object is present on the transmission coil cover or the reception coil cover and a switch configured to supply a current to the DC conducting wire based on whether the foreign object determined using the sensor is present.

More specifically, the switch may change to an ON state to supply a current to the DC conducting wire when a foreign object is determined to be present on the transmission coil cover or the reception coil cover using the sensor, and the switch may change to an OFF state to stop supplying a current to the DC conducting wire when a foreign object is determined not to be present.

Therefore, when the wireless charging system is in normal operation without any foreign object, the switch is in the OFF state, that is, the DC conducting wire is in an open state, and thus, generation of an induced current that may be induced in the DC conducting wire by an AC magnetic field may be eliminated.

Figure 5:
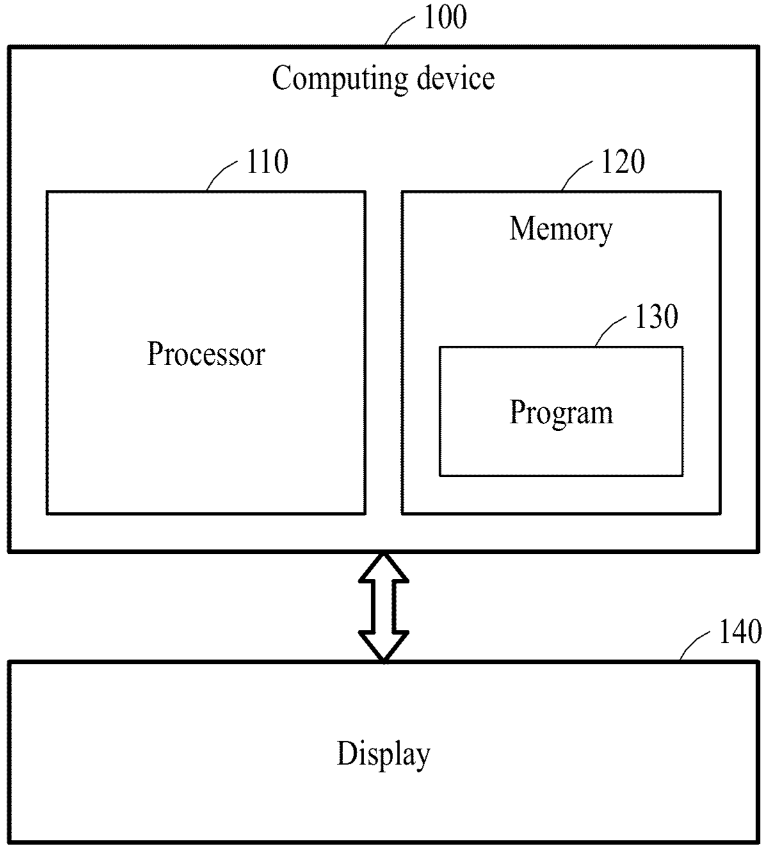
FIG. 5 is a diagram illustrating a computing device performing a method of removing a foreign object in a wireless charging system, according to an embodiment.

FIG. 5 is a diagram illustrating a computing device performing a method of removing a foreign object in a wireless charging system, according to an embodiment.

Referring to FIG. 5, a computing device 100 may include at least one processor 110 and a memory 120 configured to load or store a program 130 executed by the at least one processor 110. The components included in the computing device 100 of FIG. 5 are just an example, and one of ordinary skill in the art may understand that general-purpose components other than the components shown in FIG. 5 may be further included.

The processor 110 may control the overall operation of each component of the computing device 100. The processor 110 may include at least one of a central processing unit (CPU), a microprocessor unit (MPU), a microcontroller unit (MCU), a graphics processing unit (GPU), a neural processing unit (NPU), a digital signal processor (DSP), or other well-known types of processors in a relevant field of technology. In addition, the processor 110 may perform an operation of at least one application or program to perform the methods/operations described herein according to various embodiments. The computing device 100 may include one or more processors.

The memory 120 may store one of or two or more combinations of various pieces of data, commands, and pieces of information that are used by the components (e.g., the processor 110) included in the computing device 100. The memory 120 may include a volatile memory and/or a non-volatile memory.

The program 130 may include one or more actions through which the methods/operations described herein according to various embodiments are implemented and may be stored in the memory 120 as software. Here, an operation may correspond to a command that is implemented in the program 130. For example, the program 130 may include instructions that cause the processor to perform (i) in a process of performing wireless charging through a wireless charging system including a transmission coil of a transmission device and a reception coil of a reception device, determining, using a sensor, whether a foreign object is present on a transmission coil cover mounted to surround the transmission coil or a reception coil cover mounted to surround the reception coil, (ii) when a foreign object is determined to be present on the transmission coil cover or the reception coil cover, stopping the wireless charging and supplying a current through a switch to a DC conducting wire attached to the transmission coil cover or the reception coil cover in which the foreign object is determined to be present, for a preset period of time, (iii) determining, using the sensor, whether the foreign object that is present on the transmission coil cover or the reception coil cover is removed by the DC conducting wire to which the current is supplied for the preset period of time, and (iv) performing the wireless charging again when a foreign object that was present on the transmission coil cover or the reception coil cover is determined to be removed.

When the program 130 is loaded in the memory 120, the processor 110 may execute a plurality of operations to implement the program 130 and may perform the methods/operations described herein according to various embodiments.

An execution screen of the program 130 may be displayed on a display 140. In FIG. 5, although the display 140 is illustrated as being a separate device connected to the computing device 100, the display 140 may be included in the components of the computing device 100 when the computing device 100 is a smartphone, a tablet, or other portable terminals of a user. The screen displayed on the display 140 may be a state before information is input to the program 130 or may be an execution result of the program 130.

Figure 6:
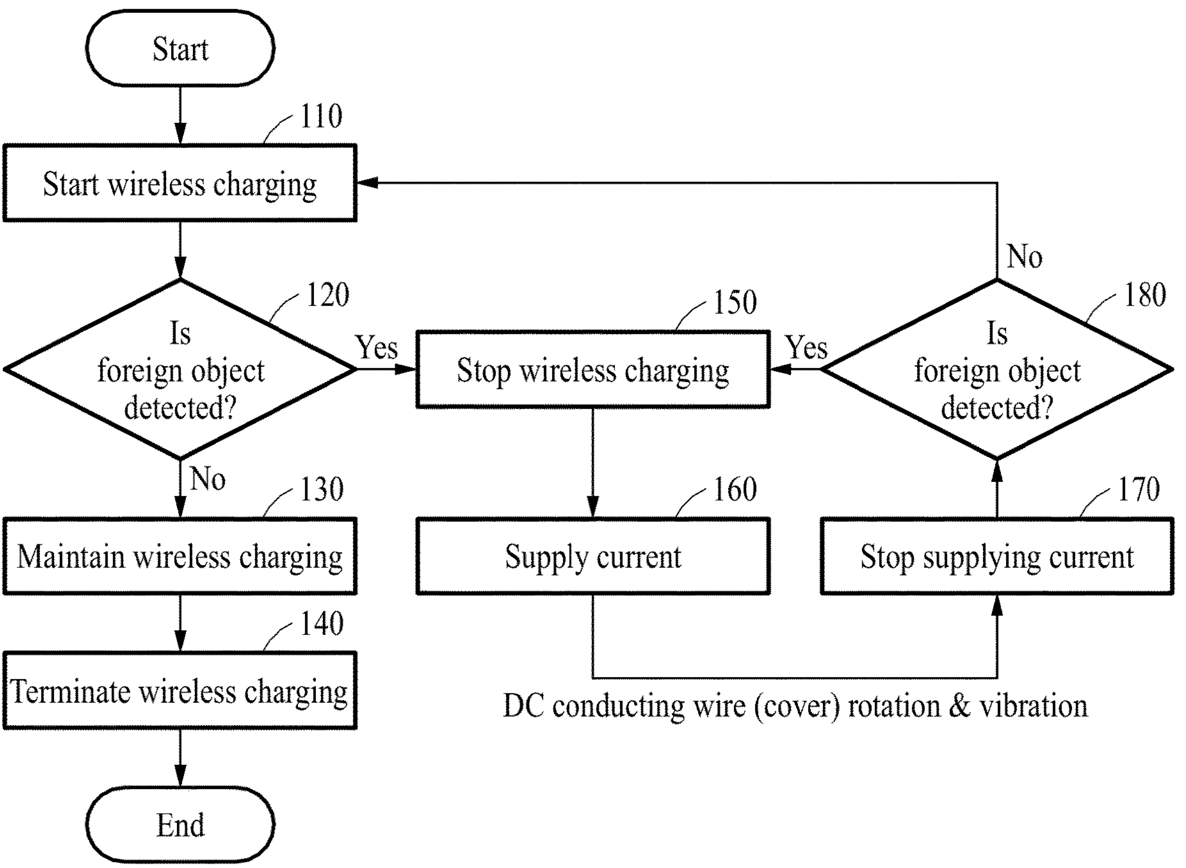
FIG. 6 is a flowchart illustrating a method of removing a foreign object, according to an embodiment.

FIG. 6 is a flowchart illustrating a method of removing a foreign object, according to an embodiment.

A method of removing a foreign object shown in FIG. 6 is performed by the processor 110 of the computing device 100. In operation 110, the processor 110 may perform wireless charging of a target by controlling the power of a wireless charging system. Subsequently, in operation 120, the processor 110 may determine, using a sensor, whether a foreign object is present on a transmission coil cover mounted to surround the transmission coil or a reception coil cover mounted to surround the reception coil.

When a foreign object is determined not to be present on the transmission coil cover or the reception coil cover, the processor 110 may maintain the wireless charging in operation 130. When the battery of the target is fully charged, the processor 110 may terminate the wireless charging in operation 140.

On the other hand, when a foreign object is present on the transmission coil cover or the reception coil cover, in operation 150, the processor 110 may stop the wireless charging and in operation 160, may supply a current to a DC conducting wire mounted on the transmission coil cover or the reception coil cover for a preset period of time. Then, the transmission/reception coil cover of the wireless charging system may rotate and vibrate according to a physical phenomenon of Lorentz's force or Fleming's left-hand rule in a magnetic field, thereby dropping or leaving the foreign object.

When the preset period of time has elapsed, in operation 170, the processor 110 may stop supplying the current to the DC conducting wire and in operation 180, may determine, using the sensor, whether the foreign object that is present on the transmission coil cover or the reception coil cover is removed.

When the foreign object is determined not to be removed, the processor 110 may repeatedly perform the process of removing the foreign object of operations 150 to 170. On the other hand, when the foreign object is determined to be removed, the processor 110 may resume the wireless charging.

According to the design of the wireless charging system, when the foreign object is not removed even in the repeated process of removing the foreign object, the processor 110 may determine whether to perform the wireless charging based on the preset number of executions for the process of removing the foreign object. When the preset number of executions for the process of removing the foreign object is exceeded, the processor 110 may stop the wireless charging and may provide related information to a user through an alarm.

The components described in the embodiments may be implemented by hardware components including, for example, at least one DSP, a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using a hardware component, a software component and/or a combination thereof. A processing device may be implemented using one or more general-purpose or special-purpose computers, such as, for example, a processor, a controller, an arithmetic logic unit (ALU), a DSP, a microcomputer, an FPGA, a programmable logic unit (PLU), a microprocessor, or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is used as singular; however, one of ordinary skill in the art will appreciate that a processing device may include multiple processing elements and/or multiple types of processing elements. For example, the processing device may include a plurality of processors, or a single processor and a single controller. In addition, different processing configurations are possible, such as parallel processors.

The software may include a computer program, a piece of code, an instruction, or one or more combinations thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software may also be distributed over network-coupled computer systems so that the software is stored and executed in a distributed fashion. The software and data may be stored in a non-transitory computer-readable recording medium.

The methods according to the embodiments may be recorded in non-transitory computer-readable media including program instructions to implement various operations of the embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as compact disc-read only memory (CD-ROM) and digital video discs (DVDs); magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

The above-described hardware devices may be configured to act as one or more software modules in order to perform the operations of the above-described embodiments, or vice versa.

Although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

Therefore, other implementations, other embodiments, and equivalents to the claims are also within the scope of the following claims.

What is claimed is:

1. A wireless charging system comprising:

a transmission coil cover mounted to surround a transmission coil of a transmission device;

a reception coil cover mounted to surround a reception coil of a reception device; and a direct current (DC) conducting wire attached to each of the transmission coil cover and the reception coil cover, wherein the wireless charging system is configured to remove a foreign object attached to the transmission coil cover or the reception coil cover by using a force acting on the DC conducting wire according to a direction of a current flowing in the DC conducting wire and a direction of a magnetic field perpendicular to the direction of the current.

2. The wireless charging system of claim 1, wherein the DC conducting wire is attached at a height of an intermediate portion of each of the transmission coil cover and the reception coil cover.

3. The wireless charging system of claim 1, wherein the DC conducting wire is configured to remove a foreign object attached to the transmission coil cover or the reception coil cover by performing a vibratory motion in a rotational direction when a direction of an applied force is changed by an alternating current (AC) magnetic field applied to the wireless charging system.

4. The wireless charging system of claim 1, further comprising:

a sensor configured to determine whether a foreign object is present on the transmission coil cover or the reception coil cover; and a switch configured to supply a current to the DC conducting wire based on whether the foreign object determined using the sensor is present.

5. The wireless charging system of claim 4, wherein the switch is configured to change to an ON state to supply a current to the DC conducting wire when a foreign object is determined to be present on the transmission coil cover or the reception coil cover using the sensor.

6. The wireless charging system of claim 4, wherein the switch is configured to change to an OFF state to stop supplying a current to the DC conducting wire when a foreign object is determined not to be present on the transmission coil cover or the reception coil cover using the sensor.

7. A method of removing a foreign object in a wireless charging system, the method comprising:

in a process of performing wireless charging through a wireless charging system comprising a transmission coil of a transmission device and a reception coil of a reception device, determining, using a sensor, whether a foreign object is present on a transmission coil cover mounted to surround the transmission coil or a reception coil cover mounted to surround the reception coil;

when a foreign object is determined to be present on the transmission coil cover or the reception coil cover, stopping the wireless charging and supplying a current through a switch to a direct current (DC) conducting wire attached to the transmission coil cover or the reception coil cover in which the foreign object is determined to be present, for a preset period of time;

determining, using the sensor, whether the foreign object that is present on the transmission coil cover or the reception coil cover is removed by the DC conducting wire to which the current is supplied for the preset period of time; and performing the wireless charging again when a foreign object that was present on the transmission coil cover or the reception coil cover is determined to be removed.

8. The method of claim 7, wherein the wireless charging system is configured to remove a foreign object attached to the transmission coil cover or the reception coil cover by using a force acting on the DC conducting wire according to a direction of a current flowing in the DC conducting wire and a direction of a magnetic field perpendicular to the direction of the current.

9. The method of claim 7, wherein the DC conducting wire is attached at a height of an intermediate portion of each of the transmission coil cover and the reception coil cover.

10. The method of claim 7, wherein the DC conducting wire is configured to remove a foreign object attached to the transmission coil cover or the reception coil cover by performing a vibratory motion in a rotational direction when a direction of an applied force is changed by an alternating current (AC) magnetic field applied to the wireless charging system.

11. A computing device comprising:

at least one processor; and a memory configured to load or store a program executed by the at least one processor, wherein the program comprises instructions that cause the processor to perform:

in a process of performing wireless charging through a wireless charging system comprising a transmission coil of a transmission device and a reception coil of a reception device, determining, using a sensor, whether a foreign object is present on a transmission coil cover mounted to surround the transmission coil or a reception coil cover mounted to surround the reception coil;

when a foreign object is determined to be present on the transmission coil cover or the reception coil cover, stopping the wireless charging and supplying a current through a switch to a direct current (DC) conducting wire attached to the transmission coil cover or the reception coil cover in which the foreign object is determined to be present, for a preset period of time;

determining, using the sensor, whether the foreign object that is present on the transmission coil cover or the reception coil cover is removed by the DC conducting wire to which the current is supplied for the preset period of time; and performing the wireless charging again when a foreign object that was present on the transmission coil cover or the reception coil cover is determined to be removed.

12. The computing device of claim 11, wherein the wireless charging system is configured to remove a foreign object attached to the transmission coil cover or the reception coil cover by using a force acting on the DC conducting wire according to a direction of a current flowing in the DC conducting wire and a direction of a magnetic field perpendicular to the direction of the current.

13. The computing device of claim 11, wherein the DC conducting wire is attached at a height of an intermediate portion of each of the transmission coil cover and the reception coil cover.

14. The computing device of claim 11, wherein the DC conducting wire is configured to remove a foreign object attached to the transmission coil cover or the reception coil cover by performing a vibratory motion in a rotational direction when a direction of an applied force is changed by an alternating current (AC) magnetic field applied to the wireless charging system.

* * * * *